US005787645A

United States Patent [19]
Heim et al.

[11] Patent Number: 5,787,645
[45] Date of Patent: *Aug. 4, 1998

[54] MOTOR VEHICLE DOOR FRAME

[75] Inventors: Gunther Heim, Obertshausen; Bruno Kroll, Radevormwald, both of Germany

[73] Assignee: YMOS Aktiengesellschaft Industrieprodukte, Obertshausen, Germany

[*] Notice: The term of this patent shall not extend beyond the expiration date of Pat. No. 5,398,453.

[21] Appl. No.: 367,441

[22] Filed: Dec. 28, 1994

Related U.S. Application Data

[63] Continuation-in-part of Ser. No. 89,074, Jul. 6, 1993, abandoned.

[30] Foreign Application Priority Data

Jul. 6, 1992 [DE] Germany ............... 42 21 795.4

[51] Int. Cl.[6] .................................................. B60J 5/04
[52] U.S. Cl. .............................. 49/502; 296/146.5
[58] Field of Search ................ 49/502, 504; 296/146.5, 296/146.2

[56] References Cited

U.S. PATENT DOCUMENTS

| 4,328,642 | 5/1982 | Presto ........................... 49/502 |
| 4,434,580 | 3/1984 | Engelsberger et al. . |
| 4,648,208 | 3/1987 | Baldamus et al. . |
| 4,662,115 | 5/1987 | Ohya et al. . |
| 4,704,822 | 11/1987 | Srock et al. . |
| 4,845,894 | 7/1989 | Herringshaw et al. ........ 296/146.2 X |
| 4,924,630 | 5/1990 | Comasney et al. .............. 296/146.5 X |
| 5,029,934 | 7/1991 | Schrader et al. ................ 49/502 X |
| 5,033,236 | 7/1991 | Szerdahelyi et al. . |
| 5,233,790 | 8/1993 | Bosotti et al. . |
| 5,308,129 | 5/1994 | Hlavaty ........................... 49/502 X |
| 5,398,453 | 3/1995 | Heim et al. ..................... 49/502 |
| 5,408,785 | 4/1995 | Heim et al. ..................... 49/502 |

FOREIGN PATENT DOCUMENTS

| 2257449 | of 1975 | France . |
| 4034599 | 2/1992 | Germany . |
| 62-134327 | 6/1987 | Japan . |
| 63-57325 | 3/1988 | Japan . |

*Primary Examiner*—Jerry Redman
*Attorney, Agent, or Firm*—W. G. Fasse; W. F. Fasse

[57] ABSTRACT

A vehicle door frame has at least three, preferably four frame members (2, 3, 4, 5, or 2', 3', 4', 5') made of hollow tubular stock having a uniform cross-section substantially along the entire length, either of each individual frame member or along the entire frame, that forms a closed frame if four frame members are provided. Thus, the individual frame members or an entire frame length can be cut from extruded or rolled tubular stock having a uniform closed cross-section along its entire length. Hinges, having sections connected to the door frame permit mounting the entire door through its frame to the vehicle body. The frame forms a carrier for a door outer skin (31) and a door inner cover (30) and other door components, e.g. hinges and a lock. The door frame also forms a guide cage for a window pane (29). At least one frame member has a uniform cross-section substantially along its entire length and at least that frame member is cut from closed rectangular hollow tubular stock having a cross-section.

22 Claims, 8 Drawing Sheets

MOTOR VEHICLE DOOR FRAME

CROSS-REFERENCE TO RELATED APPLICATION

The present application is a Continuation-In-Part of our commonly assigned application U.S. Ser. No. 08/089,074, filed on Jul. 6, 1993, now abandoned.

FIELD OF THE INVENTION

The invention relates to a frame construction for motor vehicle doors, especially motor vehicles, such as passenger cars.

BACKGROUND INFORMATION

Frame construction vehicle doors comprise at least one front frame member, one rear frame member, and an upper frame member that interconnects the front and rear frame members. The frame functions as a support for the door outer skin, a door inner cover, a door window, and further door elements. The door frame is swingably or tiltably supported by hinges. The door connected hinge sections may conventionally be secured to the frame as is disclosed in U.S. Pat. No. 4,648,208 (Baldamus et al.).

The just mentioned U.S. patent discloses a door frame comprising an upper and a lower frame section each forming a U-configuration. These U-shaped frame half sections are interconnected in the area of the front frame member and in the area of the rear frame member. The shape and configuration as well as the cross-section of the frame members forming the frame halves differ along the length of these frame members. Due to this changing of the cross-sections of the frame members along the length of the members, a rather involved and hence expensive construction results.

OBJECTS OF THE INVENTION

In view of the above it is the aim of the invention to achieve the following objects singly or in combination:

to construct a motor vehicle door frame as a frame structure which has the required strength and stiffness against torque loads, yet is simple in its construction and thus economical to manufacture;

to employ tubular sectional stock namely hollow sectional stock produced by rolling or extrusion to have a constant cross-section throughout the length for the manufacture of the door frames so that the door frame members may simply be cut off from the tubular stock;

to bend such a tubular blank into the door frame contour so that only one junction needs to be made where the blank ends face each other after the bending; and to use tubular stock that has a rectangular hollow cross-section with a flange extending laterally away from the rectangular cross-section of the sectional stock.

SUMMARY OF THE INVENTION

The above objects have been achieved according to the invention in that the door frame members are made of sectional stock that is a hollow profile or hollow section having a constant namely uniform cross-sectional configuration along the stock length, and in that at least one frame member of a door frame has such a constant cross-sectional configuration along the full length of the respective frame member.

Advantages of the invention are seen in that the hollow closed profiles or hollow sections can be mass-produced from tubular sectional stock with a cross-section that is constant over the standard stock length. A closed rectangular cross-section is preferred. The hollow tubular stock can be mass produced by extrusion pressing or roller formation in an economical manner. The so sectional stock can then be cut into suitable lengths for the frame construction in which the lengths of tubular stock are, for example, welded together to form the frame. Alternatively, a single tubular piece of sectional stock having a sufficient length for forming all frame members by bending the single piece of sectional stock into the door frame contour requiring only one connection where the stock ends meet after bending. In all instances the sectional stock has a closed cross-section.

An especially advantageous tubular cross-sectional configuration is provided by tubular stock that has in addition to the closed cross-section a lateral flange which forms a surface for the attachment of other door components to the frame structure. The tubular cross-section which is preferably a rectangular cross-section of the tubular stock with the integral lateral flange forms an L-cross-sectional configuration. Other door frame components may, for example include a sealing strip or the lateral flange may act as a guide element, for example, for a door window. These features also reduce the production costs.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
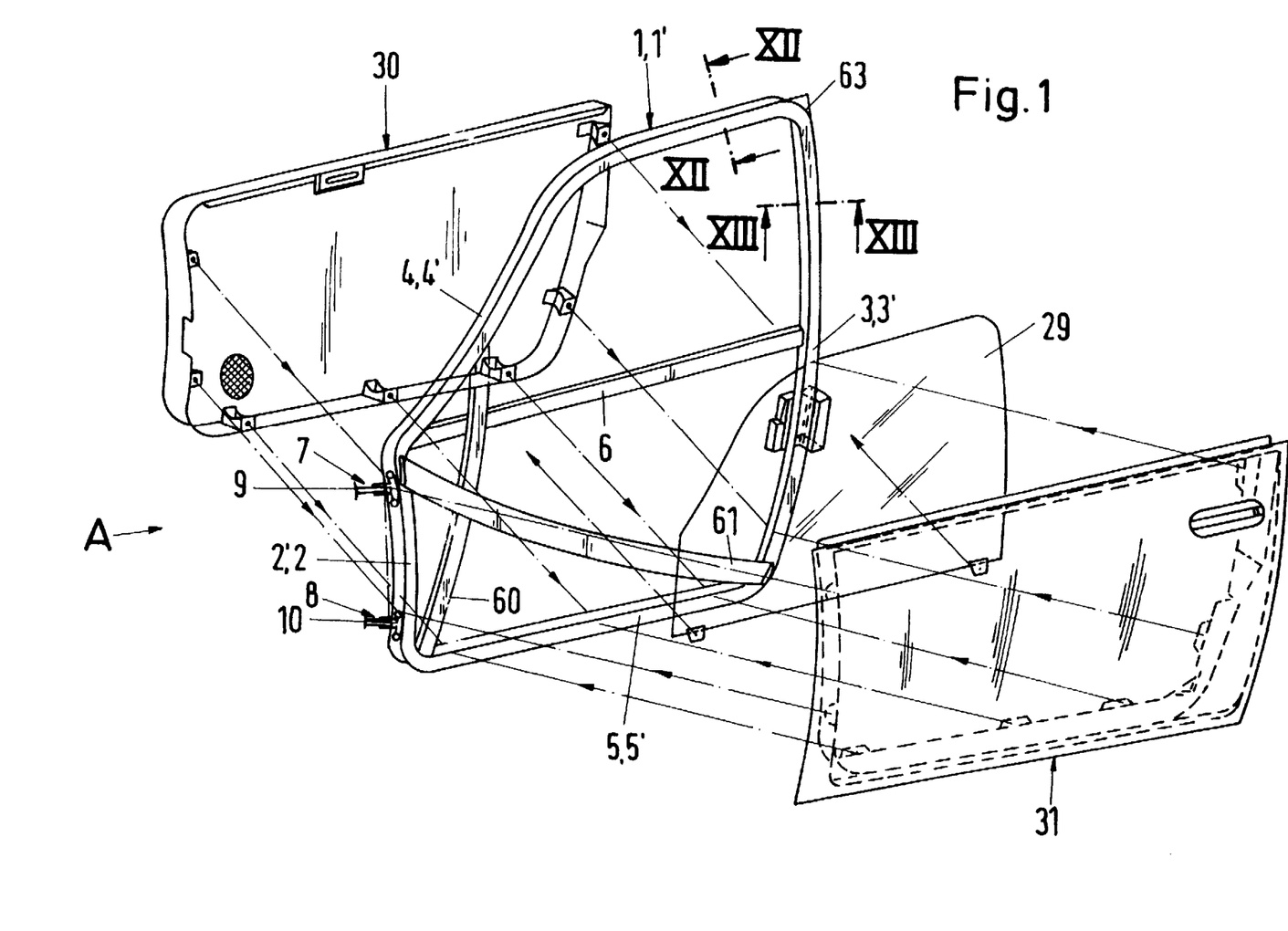
FIG. 1 is an exploded view of a left front vehicle door frame according to the invention also illustrating other door components.

FIG. 1 shows a supporting vehicle door frame 1 comprising, as viewed in the vehicle forward moving direction, a forward frame member 2, a rear frame member 3, an upper frame member 4, and in this preferred embodiment a lower frame member 5 that completes a fully closed support frame structure 1. FIG. 1 further shows a cross bar 6 as part of the frame 1. The cross bar 6 forms an upper border of a cage formed inside the lower portion of the door frame. Additionally, a forward window guide member 60 extends from the junction between the forward frame member 2 and the lower frame member 5, toward a slanted portion of the upper frame member 4. The guide member 60 guides a window pane 29 and functions additionally as a reinforcement or protection against lateral impacts, thereby cooperating with a further reinforcing bar 61, preferably extending diagonally across the lower frame portion and slanting preferably downwardly from a bend in the forward frame member 2 toward the junction between the lower frame member 5 and the rear frame member 3.

According to a preferred embodiment of the invention the frame members 2, 3, 4 and 5 are elements with a closed rectangular cross-section having a constant namely uniform cross-sectional configuration substantially along the entire length of the respective frame member. The sectional configurations are particularly evident from FIGS. 5 to 13 described below.

Hinges 7 and 8 serve for securing the door frame to the vehicle cell or body. These hinges 7 and 8 have door hinge sections 9 and 10 as well as body hinge sections not shown. Preferably, the door hinge sections 9 and 10 are screwed directly to the forward frame member 2. Please see in this connection particularly FIGS. 2 to 7.

Each door hinge section 9 and 10 comprises through-bores 11, for example to receive flat head screws 12 for direct attachment to the forward frame member. Through-bores 13 are also provided in the frame member 2, whereby the inner diameter of the bores 13 depends on the type and manner of securing the flat head screws 12 to the forward frame member 2. According to the embodiment shown in FIGS. 3 and 5, rivet nuts 14 are provided for securing the hinge sections 9, 10 to the forward frame member 2. These rivet nuts 14 must be introduced into the interior of the frame member 2 through the through-bores 13. The rivet nuts 14 must spread when tightened to bear against the back of the edge of the through-bores 13.

Figure 5:
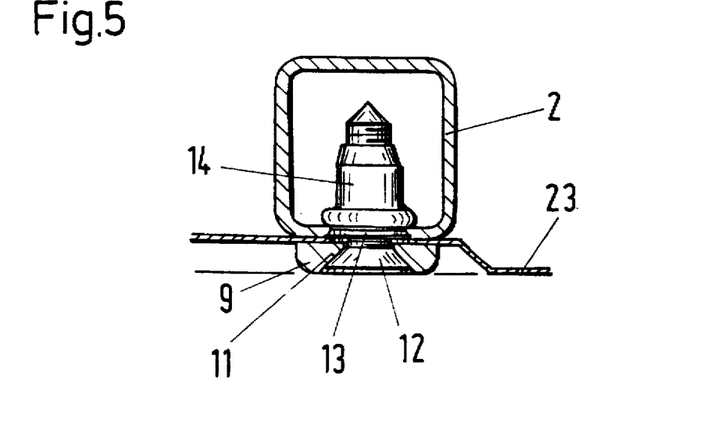
FIG. 5 is a sectional view along section line V—V in FIG. 3 showing an extruded tubular frame member having a rectangular closed cross-section.
Figure 6:
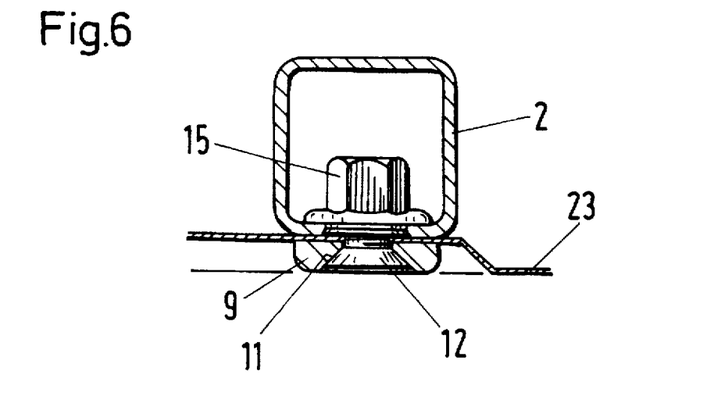
FIG. 6 is a sectional view as in FIG. 5 illustrating a modified embodiment for the hinge connection.
Figure 7:
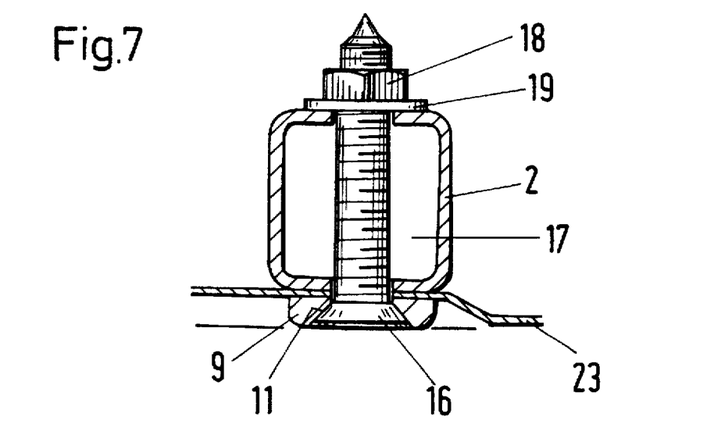
FIG. 7 is a sectional view as in FIG. 5, illustrating a further variant for the hinge connection.

FIG. 6 illustrates a modified rivet nut 15. FIG. 7 relates to the embodiment wherein the flat head screw 16 is not secured with a nut 18 on the inside 17 of the frame member 2 as is the case with the rivet nuts 14 and 15 in the example embodiments according to FIGS. 5 and 6. Rather, according to FIG. 7, the flat head screw 16 passes through the entire frame member 2 and is fixed on the away facing side with the aid of a fitting nut 18 and a flange or washer 19.

Figure 3:
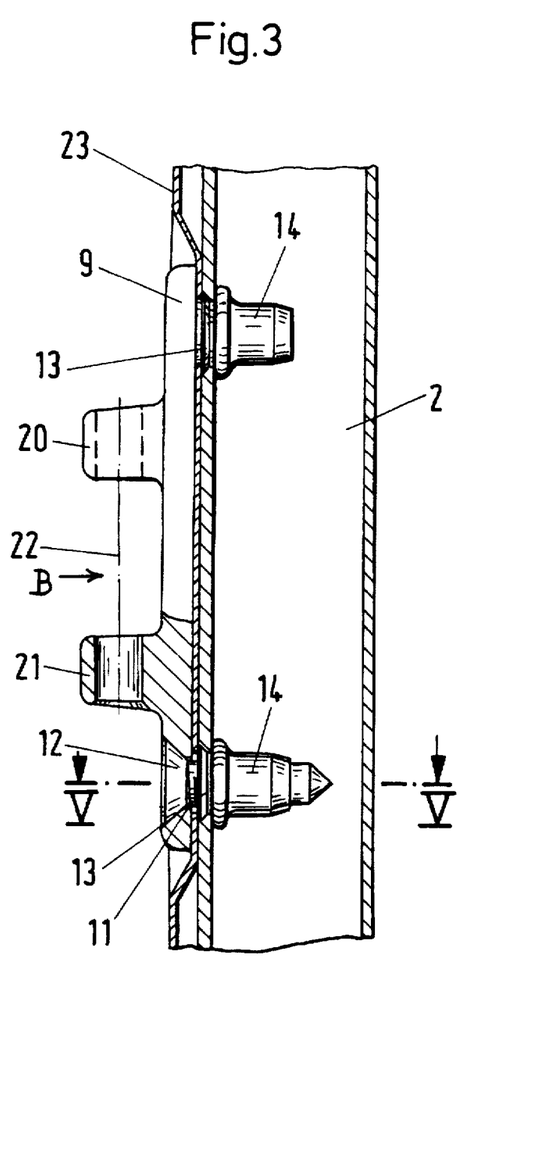
FIG. 3 shows on a still larger scale and partially broken away a sectional view of a frame section with a hinge element directly connected to the door frame.
Figure 4:
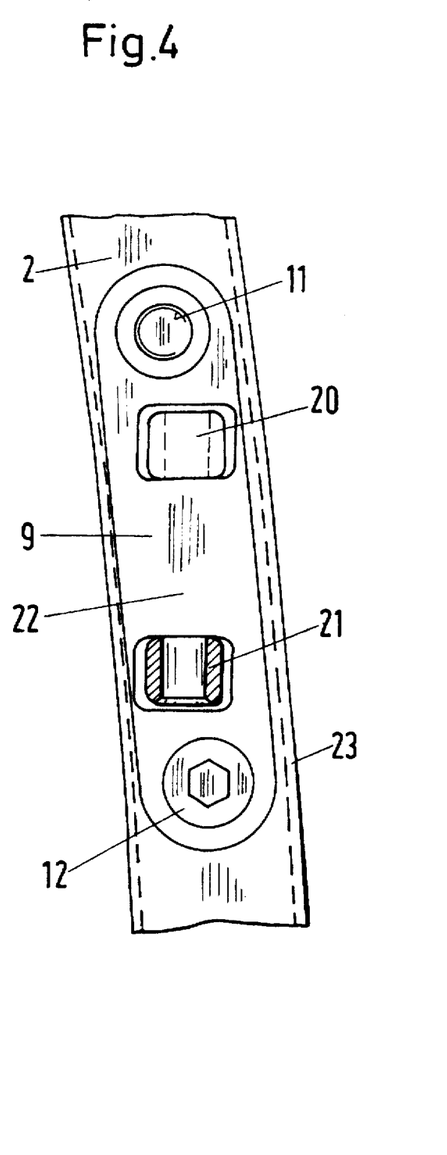
FIG. 4 is a broken away view in the direction of the arrow B in FIG. 3, showing a front view of the hinge element directly connected to the door frame with one hinge pin holder shown in section.

Both FIGS. 3 and 4 show further, partially in section, two bearing locations formed by hinge pin holders 20 and 21 for a hinge pin, not shown, but extending in the direction of the axis 22.

According to the illustration in FIGS. 3 to 7, a cover sheet metal member serving only for decorating purposes or a hinge sheet metal member 23 may be provided and is clamped between the door hinge sections 9 and 10 and the frame member 2.

Figure 2:
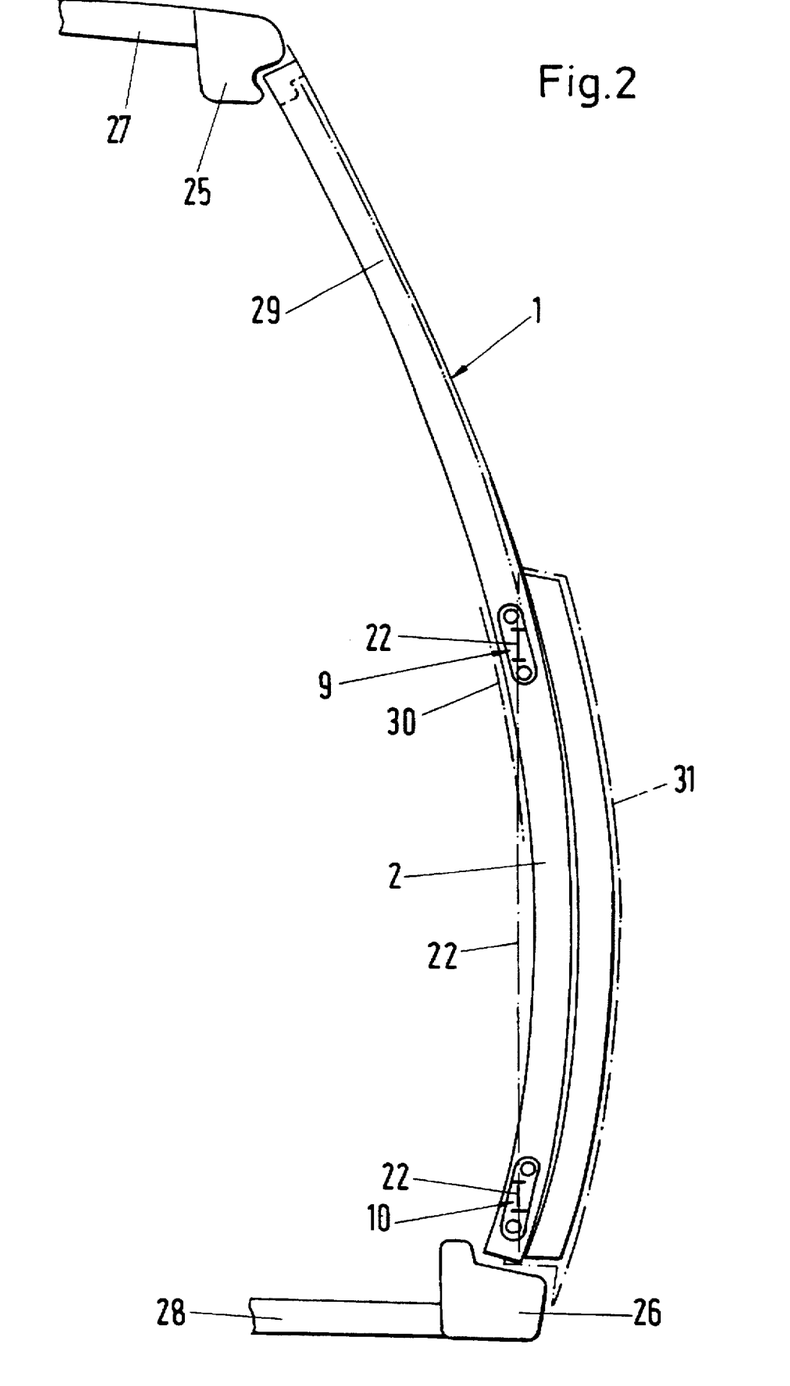
FIG. 2 shows on an enlarged scale a view in the direction of the arrow A in FIG. 1 illustrating further door components.

FIG. 2 shows schematically the door frame 1 with the door hinge sections 9 and 10 in a front view in the direction of the arrow A in FIG. 1. A roof longitudinal beam 25, a floor longitudinal beam 26, and cross-struts 27 and 28 of the vehicle body or cell and the door window 29 are indicated schematically. A door inner covering 30 and a door outer skin 31 are also illustrated as well as other door components such as a lock. The other door components are not of interest here. These other door components are secured to the frame 1. The securing of the door outer skin 31 to the frame 1 takes place in such a way that an adjustment of the door outer skin 31 relative to the frame 1 is possible. The adjustment is preferably performed with the aid of screws or by using further holding devices such as clamps, as is apparent in detail from FIGS. 8 to 10. The inner door covering 30 and the outer door skin 31 are secured to the frame members as shown by dash-dotted lines provided with arrow heads as shown in FIG. 1.

Figure 8:
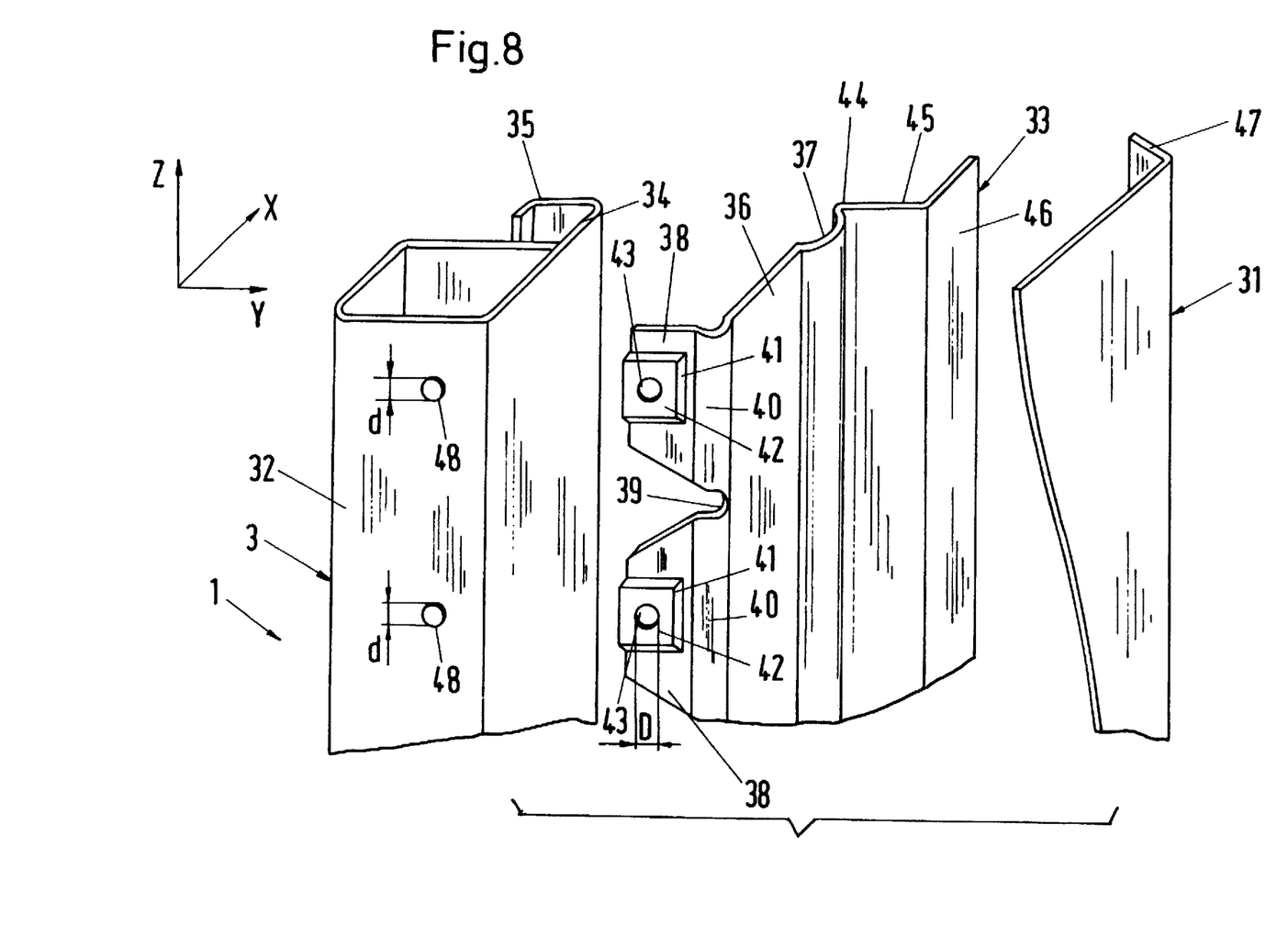
FIG. 8 is a perspective partially broken away illustration of a frame member produced from rolled tubular stock with a closed cross-sectional portion and a flange portion, and further showing an intermediate sheet metal element and a portion of an outer door skin shown in a not yet assembled state.

FIG. 8 shows in a perspective view a cut-off piece 32 of the frame member 3 of the frame 1 shown in FIG. 1 and spaced therefrom a cut-off piece of an intermediate door component 33 with the aid of which the door outer skin 31 is secured to the frame 1 in the area of the frame member 3.

Referring further to FIG. 8, the rear frame member 3 is, for example, a piece 32 cut off from rolled stock having in addition to the closed section portion a laterally projecting flange section 34 bent over into an angular section 35. The flange section 34 and the angular section 35 serve, for example, to hold a door seal strip not shown.

Figure 9:
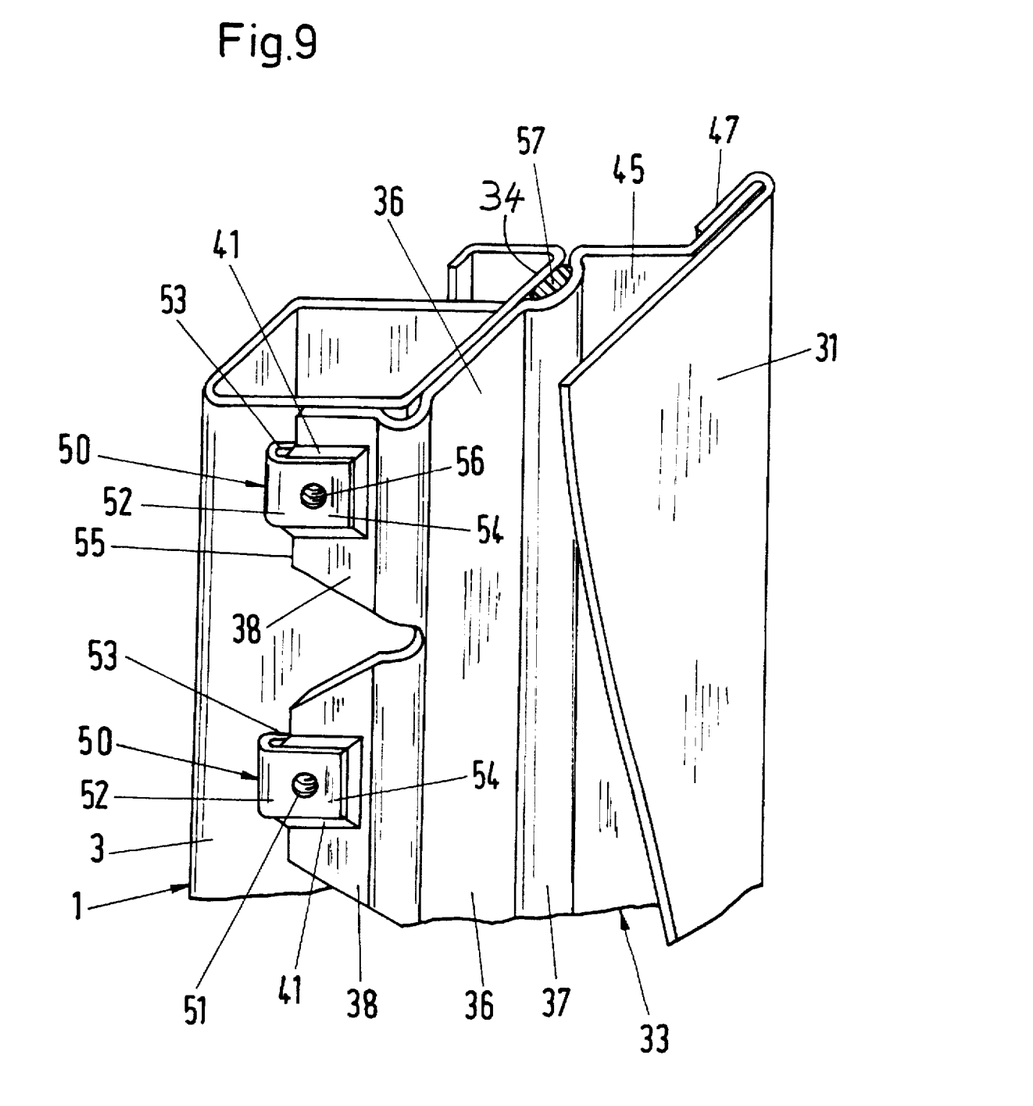
FIG. 9 is a broken away, perspective illustration of the elements according to FIG. 8, in an assembled state.
Figure 10:
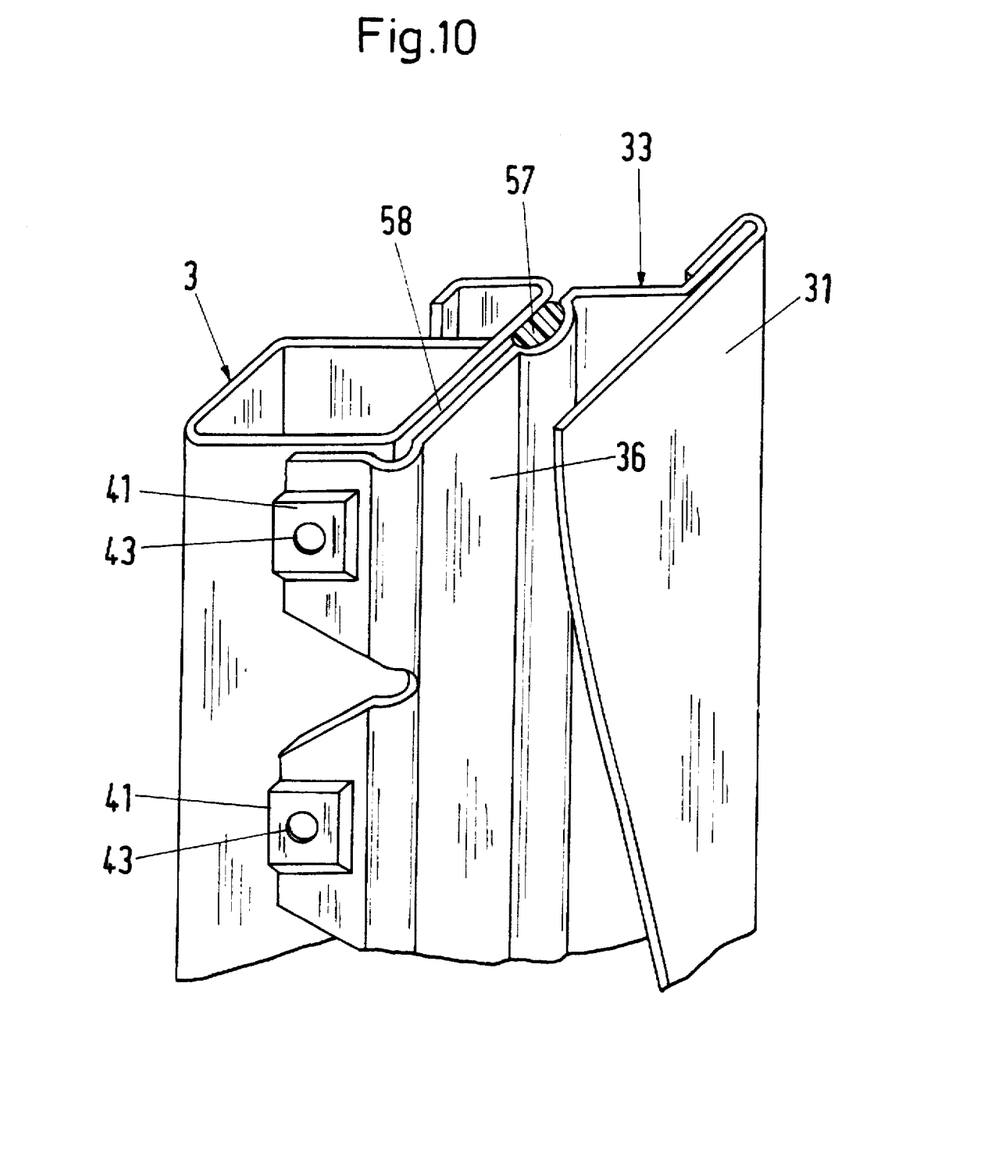
FIG. 10 is a view as in FIG. 9, wherein the elements, however are connected to each other in a somewhat different position for compensating manufacturing tolerances.

Referring to FIGS. 8, 9, and 10 in conjunction, an intermediate piece 33 comprises a central portion 36 with a reinforcement bead 37 and mounting plates 38 along one rim 39. According to the type of use shown in the example embodiment of FIGS. 8 to 10, the mounting plates 38 are angled relative to the central portion 36 of the intermediate piece 33. The corner between the mounting plates 38 and the central portion 36 is preferably formed by curved pieces 40.

The mounting plates 38 comprise crimped reinforcements 41 providing a support surface 42. A through-bore 43 having a diameter D extends through each support surface 42.

Referring still to FIG. 8, an angular piece 45 is connected to and along the other longitudinal edge 44 of the central portion 36 of the intermediate piece 33. One leg 46 of the angular piece 45 serves for crimping with a rim section 47 of the door outer skin 31 as is apparent from FIGS. 9 and 10.

Corresponding to the positions of the through-bores 43 in the crimped reinforcements 41 on the mounting plates 38 of the intermediate piece 33, the frame member 3 also comprises through-bores 48 with a diameter d. The diameter D of the through-bores 43 in the crimped reinforcements 41 of the mounting plates 38 is larger than the diameter d of the through-bores 48 in the frame member 3. The intermediate piece 33 is thus adjustable in accordance with the difference between the diameters D and d in the direction of the axes Z and Y of the rectangular coordinate system shown in FIG. 8, relative to the frame member 3 prior to tightening piece 33 to member 3 with the aid of securing elements such as screws passing through the through-bores 43 and 48.

In the preferred embodiment the intermediate piece 33 and thus the door outer skin 31 are securable to the frame 1 by using position adjustable mountings which permit an adjustment of the door outer skin 31 relative to the frame 1. The use of through-bores 43 and 48 of different inner diameters D and d in combination with securing elements passing through these bores, for example, in the form of screws provides one possibility for an adjustable mounting 50 shown in FIG. 9 of the door outer skin 31 on the frame 1. However, other types of mountings are basically possible, such as clamps, rivets set after adjustment, or the like.

As shown in FIG. 9, in the example embodiment one screw 51 passes through each pair of through-bores 43 and 48 and thus fixes the intermediate piece 33 to the frame member 3. In addition, the crimped reinforcements 41 are constructed for fixing the position of a clip-type holding clamp 52 which has two interconnected spring legs 53 and 54 forming a U-cross-section. One spring leg 53 is located inside the concave portion of the crimped reinforcement 41 and the other leg 54 is located on the support surface 42 of the crimped reinforcement 41 which extends as a channel from the outer rim 55 into the respective mounting plate 38 so that the holding clamp 52 with its U-shaped cross-section reaches around the rim 55 of the mounting plate 38, whereby the position of the clamp 52 is fixed by the crimped reinforcement 41.

One leg 53 of the holding clamp 52 has a through opening for the screw 51 while a threading 56 for the screw 51 is positioned in the other leg 54. The holding clamp 52 thus also functions as a nut, because the screw 51 that serves for the attachment is held with the aid of the holding clamp 52 or rather by the threading 56 provided in the clamp 52.

In the assembled state the door outer skin 31 is crimped as shown at 47 in FIG. 9 and rests with the central portion 36 of the intermediate piece 33 on the frame member 3. This represents one limit position for the possible adjustability in the Z- and Y-directions. The reinforcement bead 37 further serves for receiving a sealing strip 57 which is substantially compressed in the position shown in FIG. 9 between the bead 37 and the flange section 34. Closed cell foam rubber is suitably used as the material for the sealing strip 57.

FIG. 10 shows an attachment of the door outer skin 31 to the frame member 3 in another limit position in which the central portion 36 of the intermediate piece 33 is spaced from the frame member 3 or rather from the support surface 58 of the frame member 3 facing the central portion 36.

The mounting plates 38 are preferably flexible relative to the central portion 36 of the intermediate piece 33 and it is understood that the screws 51 serving as a through going attachment device have a cross-section which is smaller than the diameter D of the through-bore 43.

Preferably, all the frame members 2, 3, 4 and 5 have a constant, closed cross-sectional configuration along their entire length. However, each frame member may have a cross-sectional configuration of a different size. In the first instance all frame members may be cut from the same stock. In the second instance the frame members may be cut from different stock sizes. Further, a unitary, integral single-piece frame structure may be formed if all frame members have the same closed cross-section, in such a way that the ends of a single stock piece after bending are connected to form a closed frame ring. FIG. 1 shows the connection at 63.

FIGS. 5, 6 and 7 show a sectional view through the forward frame member 2. The tubular stock has preferably a rectangular closed hollow cross-section and still more preferable, a square closed hollow cross-section. Such square or rectangular cross-section tubular stock is economically produced, for example, as an extrusion section.

FIGS. 8 to 10 show, for example, the rear frame member 3 formed of sectional stock produced as rolled stock to achieve the above mentioned cross-sectional configuration of a square portion to which is integrally connected the lateral flange section 34 that may be rolled into the angular section 35 as mentioned above.

Depending on the strength and other requirements that must be met by the individual cross-sectional configurations of the frame members 2, 3, 4 and 5, these frame members will, according to the invention preferably, have the same hollow closed cross-sectional configuration substantially along the entire length of the particular frame member. However, the four frame members forming an integral frame may have relative to each other, different cross-sectional configurations especially differently sized cross-sections. If all members 2, 3, 4 and 5 have the same cross-sectional size and configuration, a single blank of stock material will be bent into the configuration shown, for example, in FIG. 1. In case the frame member 2 has the configuration of FIG. 5 and the frame member 3 has the configuration of FIG. 8, different tubular stock sections are used and the cut frame members may then be secured to each other, for instance at the corners by welding or gussets or the like.

Figure 11:
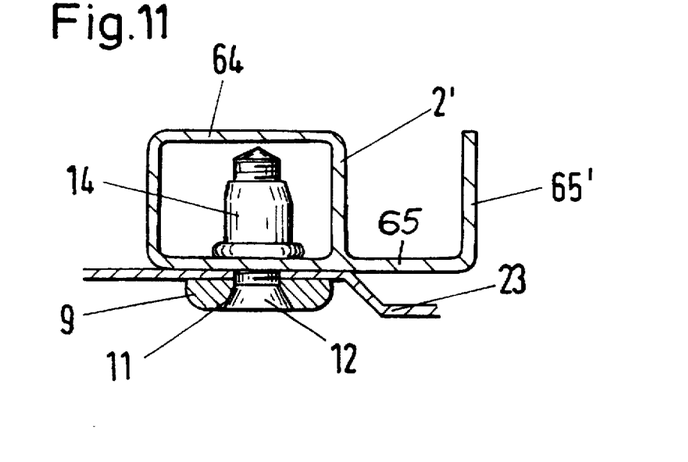
FIG. 11 shows a sectional view as in FIG. 5, however illustrating an extruded sectional stock having a portion with a closed cross-sectional configuration and a portion forming a lateral flange, whereby the section forms a front frame member.
Figure 12:
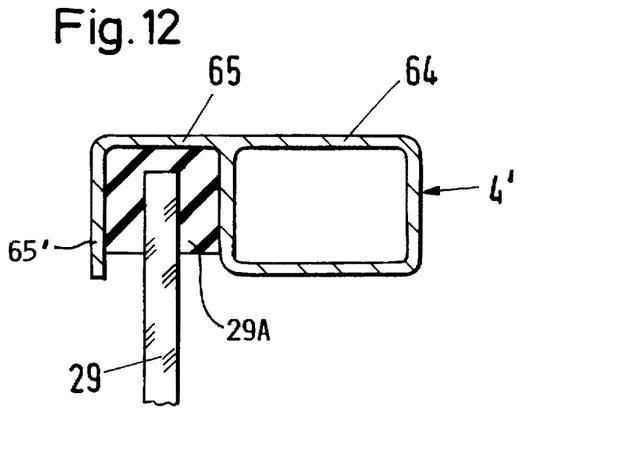
FIG. 12 is a sectional view as in FIG. 11, but illustrating an upper frame member along the section line XII—XII shown in FIG. 1.
Figure 13:
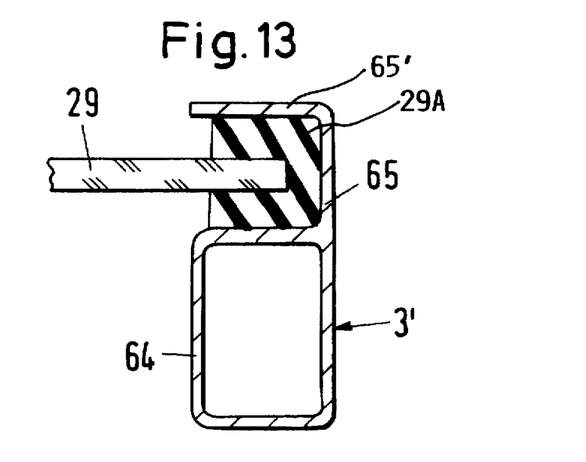
FIG. 13 is a sectional view as in FIG. 11, but illustrating a rear frame member along the section line XIII—XIII shown in FIG. 1.

FIGS. 11, 12 and 13 show an embodiment wherein each tubular frame member has the same closed rectangular hollow uniform cross-sectional configuration as all other frame members 2', 3', 4' and 5'. Their frame configuration or contour is shown in FIG. 1. The starting material for this embodiment is a stock piece of extruded stock. If the lower frame member 5' has the same closed rectangular hollow configuration as members 2, 3, and 4, then all frame members 2', 3', 4' and 5' can be made of the same stock piece to form the closed frame 1' from a single blank in an integral one-piece construction in which only the upper frame corner 63 shown in FIG. 1 connects the two ends of the single-piece blank that has been bent into the closed ring contour shown in FIG. 1. The corner 63 may be formed by welding, for example.

The front frame member 2', the rear frame member 3' and the upper frame member 4' shown in FIGS. 11 to 13 are portions of an extruded section that has a closed rectangular hollow cross-sectional portion 64, one side of which extends into a flange 65 which is in turn bent as shown at 65'. The flange portion 65 is an extension of the side wall of the portion 64. The frame connected hinge sections 9 and 10 are secured to the side wall of the rectangular portion that has the flange extension. Flat head countersunk screws 12 and rivet nuts 14 are securing the hinge sections 9 and 10 to the portion 64, whereby the hinge sections have countersunk holes 11. If desired, a washer-type hinge sheet metal member 23 may be inserted between the frame member and the hinge sections as shown in FIG. 11.

FIG. 12 shows a window guide molding 29A received in the channel formed by the flange 65, its angular extension 65', and by the respective wall of the rectangular portion 64. The window pane 29 is guided by the guide molding 29A. This guide molding 29A is also shown in FIG. 13 which shows the rear frame section 3' having the same cross-section 64, 65, 65' as the front and upper frame sections 2' and 4' shown in FIGS. 11 and 12 respectively. The guide moldings 29A are preferably made of a rubber-type material.

FIGS. 11, 12 and 13 show that it is possible according to the invention to construct the entire or complete frame 1' from a single closed rectangular hollow sectional stock of sufficient length except for the formation of the corner 63. This type of construction provides the benefit of substantial cost reductions.

Although the invention has been described with reference to specific example embodiments, it will be appreciated that it is intended to cover all modifications and equivalents within the scope of the appended claims.

What is claimed is:

1. A motor vehicle door frame, comprising a door frame structure (1, 1') for supporting door components, said door frame structure comprising at least three rigidly interconnected frame members including a forward frame member (2, 2'), an upper frame member (4, 4'), and a rear frame member (3, 3'), at least said forward frame member comprising four walls enclosing a rectangular hollow cross-section of sectional stock which is closed on all four sides, said closed rectangular hollow cross-section having the same rectangular sectional configuration substantially along its entire length, and threaded elements for securing door hinge sections to said forward frame member (2, 2').

2. The motor vehicle door frame of claim 1, wherein forward frame member having said closed rectangular hollow cross-section comprises a flange (34) extending integrally away from said closed rectangular hollow cross-section, said flange (34, 65) having an angular portion (35, 65'), whereby said flange (34, 65), said closed rectangular hollow cross-section, and said angular portion (35, 65') form a single piece structure.

3. The motor vehicle door frame of claim 2, wherein said integral flange (34, 65) and said angular portion (35, 65') form a supporting guide channel for a door window (29).

4. The motor vehicle door frame of claim 2, wherein all at least three frame members together have a given frame member length, and wherein all at least three frame members are made of a single piece of said sectional stock having said closed rectangular hollow cross-section and a stock length equal to said given frame member length so that all at least three frame members are made of the same piece of sectional stock.

5. The motor vehicle door frame of claim 4, wherein said single piece of sectional stock is a roller produced sectional stock.

6. The motor vehicle door frame of claim 4, wherein said single piece of sectional stock is an extrusion produced sectional stock.

7. The motor vehicle door frame of claim 4, wherein said door frame structure (1, 1') further comprises a lower frame member (5, 5') that closes said frame (1, 1') to form a lower door edge, said lower frame member (5, 5') is also made of said single piece of sectional stock, whereby said stock length is sufficient for all four frame members.

8. The motor vehicle door frame of claim 1, further comprising an intermediate piece (33) secured to said door frame structure, and mounting means (50) for securing an outer door skin (31) to said door frame structure through said intermediate piece (33), and wherein said mounting means (50) permits a position adjustment of said outer skin (31) relative to said door frame structure (1.1').

9. The motor vehicle door frame of claim 8, wherein said mounting means (50) comprise through-bores (43) and fastening members (51) for securing said outer door skin (31) to said door frame structure, and wherein said through-bores (43) have an inner diameter that is larger than a cross-section outer diameter of said fastening member (51) passing through said through-bores (43), whereby a position adjustment range is limited to a difference in said diameters.

10. The motor vehicle door frame of claim 9, wherein said fastening members comprise screws (51).

11. The motor vehicle door frame of claim 8, wherein said mounting means comprise holding clamps (52) having a U-cross-section for securing said outer door skin (31) to said supporting frame.

12. The motor vehicle door frame of claim 8, wherein said intermediate piece (33) comprises on its frame facing side at least one mounting plate (38) for securing of said outer door skin to said door frame structure (1, 1').

13. The motor vehicle door frame of claim 12, comprising a plurality of angled mounting plates (38).

14. The motor vehicle door frame of claim 13, wherein said mounting plates (38) are flexible.

15. The motor vehicle door frame of claim 13, wherein said mounting plates (38) comprise crimped reinforcements (41), and wherein said mounting means comprise holding clamps (52) each arranged with one clamp leg (53) in said crimped reinforcements (41).

16. The motor vehicle door frame of claim 12, wherein said mounting plate (38) comprises through-bores (43) with an inner diameter (D) which is larger than an outer diameter of said mounting means (51) extending through said through-bores.

17. The motor vehicle door frame of claim 12, wherein said intermediate piece (33) comprises a section (36) with a reinforcing bead (37).

18. The motor vehicle door frame of claim 17, wherein said reinforcing bead (37) serves for receiving a sealing strip (57) in addition to its reinforcing function.

19. The motor vehicle door frame of claim 1, wherein said upper frame member (4, 4') comprises a forwardly and downwardly slanted section, said motor vehicle door frame further comprising a window guide member (60) having an upper end rigidly connected to said slanted section of said upper frame member, said window guide member (60) having a lower end rigidly connected to said forward frame member (2, 2') so that said window guide member (60) extends parallel to said rear frame member (3, 3').

20. The motor vehicle door frame of claim 1, further comprising a reinforcing bar (61) extending diagonally across said door frame structure, said reinforcing bar (61) being rigidly connected to a junction between said upper frame member (4, 4') and said forward frame member (2, 2'), said reinforcing bar being further rigidly connected to a lower end of said rear frame member (3, 3').

21. The motor vehicle door frame of claim 1, further comprising a cross-bar (6) extending horizontally across said door frame structure, said cross-bar (6) having a forward end rigidly connected to a junction between said upper frame member (4, 4') and said forward frame member, and a rear end rigidly connected to said rear frame member intermediate rear frame member ends.

22. A motor vehicle door comprising a door frame structure (1, 1') supporting door components including an outer door skin (31), an inner door cover (30), a door window (29), and further door elements including door hinge sections (9, 10) secured to said frame structure (1, 1'), said supporting door frame structure comprising a plurality of frame members including at least one forward frame member (2, 2'), a rear frame member (3, 3') and an upper frame member (4, 4') interconnecting said forward frame member with said rear frame member, wherein at least said forward frame member comprises four walls enclosing a rectangular hollow cross-section of sectional stock which is closed on all four sides, said closed rectangular hollow cross-section having the same rectangular sectional configuration substantially along its entire length, and threaded elements securing said door hinge sections (9, 10) directly to said forward frame member (2, 2'), wherein said outer door skin (31) has a rim section (47) along one skin edge, said vehicle door further comprising an intermediate piece (33) having one edge (46) around which said rim section (47) of said outer door skin (31) is crimped, said intermediate piece (33) further comprising at least one mounting plate (38) opposite said one edge for mounting said intermediate piece to said support frame and position adjustable mountings (43, 48, 51) cooperating with said at least one mounting plate (38) of said intermediate piece (33) for securing said intermediate piece (33) to said door frame structure (1, 1') in a position adjustable manner.

* * * * *